UNITED STATES PATENT OFFICE 2,219,748

THIOXANE SULPHUR TRIOXIDE ADDITION COMPOUND

Paul Nawiasky, Summit, and Gerhard Ewald Sprenger, Westfield, N. J., assignors to General Aniline & Film Corporation, a corporation of Delaware No Drawing. Application March 7, 1939, Serial No. 260,330

5 Claims. (Cl. 260—327)

This invention relates to new chemical compositions, the methods of their manufacture and their technical uses, and more particularly to the production and utilization of addition compounds of thioxane with sulphuric acid derivatives. Specifically our invention pertains to addition compounds of thioxane with sulphur trioxide and the use thereof as sulphonating and sulphating agents.

It is an object of our invention to prepare certain new addition compounds of thioxane with sulphuric acid derivatives.

It is also an object of our invention to develop a new sulphonating and sulphating agent.

It is a further object of our invention to develop an improved process for sulphonating and sulphating certain classes of organic compounds.

Further objects of our invention may be seen from the detailed description given below.

Addition compounds of thioxane and sulphuric acid derivatives such as sulphur trioxide, chlorsulphonic acid, fluorsulphonic acid, etc. have never been prepared hitherto. These addition compounds are of great importance in industry by reason of the surprising ease with which they react with certain classes of organic compounds such as secondary alcohols to form sulphuric acid esters which are otherwise only obtainable with difficulty, and generally with unsaturated compounds to form organic unsaturated sulphonic acids. As will be shown in greater detail hereinafter, the latter type of compounds cannot be prepared otherwise without the formation of by-products which are often useless waste materials, the separation of which from the useful compounds is difficult and frequently renders their production commercially unprofitable.

Addition compounds of basic compounds with sulphuric acid derivatives are known and have been used as sulphonating agents, e. g. the addition compound of pyridine with sulphur trioxide (Baumgarten Ber. 59, 1976 (1926)). It is also common knowledge that the undefined addition compounds of alkyl ethers with chlorsulphonic acid or sulphur trioxide are sulphonating agents which are often used in preference to the free sulphuric acid derivatives in spite of the easy inflammability of ethers and the fire hazard thus involved. More recently, the sulphuric acid addition compounds of a cyclic ether, 1-4 dioxane, have been suggested as an improved sulphonating agent.

We have now found that 1-4 thioxane of the formula:

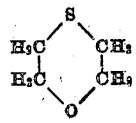

which is a cyclic ether and a weak base in the form of its sulphonium compound, reacts with certain sulphuric acid derivatives in a manner analogous to dioxane, but reacts in an entirely unexpected way with others. Thus it reacts with sulphur trioxide in analogy to dioxane to form coordination compounds such as may be presented by the formula:

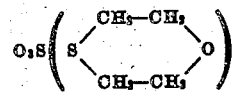

and

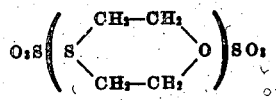

These products are white solids which are difficultly soluble in solvents such as benzene, ethylene dichloride and carbon tetrachloride and which compounds are characterized by their surprising stability against heat in that they do not decompose in the above mentioned solvents even when heated to boiling under atmospheric pressure. However, they do decompose easily in water due to hydrolysis to reform unchanged thioxane and sulphuric acid.

On the other hand, thioxane, in contrast to dioxane reacts in a different way with chlorsulphonic acid, by partly decomposing the chlorsulphonic acid into sulphur trioxide and hydrochloric acid. The formed sulphur trioxide adds to thioxane to give the coordination compounds while the hydrochloric acid escapes from the reaction mixture. If dioxane, under similar circumstances is used, no evolution of hydrochloric acid takes place. This difference in the reaction of thioxane and dioxane with chlorsulphonic acid makes the thioxane chlorsulphonic acid reaction product an improved sulphonating agent as compared with the dioxane chlorsulphonic acid reaction product by reason of the removal of substantial amounts of hydrochloric acid, originating from the chlorsulphonic acid, in the case of the use of thioxane, whereas the hydrochloric acid is not removed at all when dioxane is used. Virtually, therefore, the easily manipulated chlorsulphonic acid, in connection with thioxane, can, for all practical purposes, be substituted for free $SO_3$ which is not commercially available as such being supplied only in the form of its solution in sulphuric acid, from which it must be regenerated when its use in the free form is desired.

Another improvement will become obvious from the use of thioxane as a sulphonating aid. After the completion of a sulphonation reaction it is, in most cases, desirable to remove the sulphonating aid, whether it is pyridine, ethers, acid anhydrides, dioxane or thioxane, from the sulphonated material. The easiest removal in practically all cases is by steam distillation which also removes solvents which may have been used as diluents in the sulphonation. The recovery of pyridine and dioxane from a steam distillation condensate is rendered difficult by reason of their easy solubility, even miscibility with the water, from which they can only be recovered by salting out or if possible by extraction with water-insoluble solvents. Thioxane, however, is not miscible with water and is only slightly soluble in water and can, therefore, be recovered from it by a mere gravity separation, since it is heavier than water and forms the bottom layer in mixtures therewith. This easy and more complete recovery of solvent and sulphonating aid represents a marked improvement in all cases where it is used and may even be a decisive factor in cases where a relatively cheap sulphonated product is obtained.

A further advantage of thioxane is its relatively high boiling point of about 150° C. Dioxane and pyridine have lower boiling points of approximately 100° C. The higher boiling point of thioxane facilitates the separation thereof from the solvents such as carbon tetrachloride, benzene and ethylene dichloride which are usually employed in sulphonation processes.

Heretofore sulphonations have been commonly carried out by treating the compounds to be sulphonated with strong sulphuric acid, fuming sulphuric acid, sulphur trioxide, chlorsulphonic acid and the like. We are, of course, aware of other methods of sulphonation, such as treating certain unsaturated compounds, containing carbonyl groups, with bisulphites, and other methods. We are, however, not concerned with such special methods and prefer to confine our considerations to common sulphonating agents such as belong to the class which we have enumerated above and which will be referred to later on as "sulphonating agents" in a sense that this term will denote such agents whether they are used to form sulphuric acid esters, true sulphonic acids or both.

The advanced methods of sulphonation comprise reacting the compounds to be sulphonated with sulphonating agents in the presence of solvents which act merely as diluents for the purpose of delocalizing the reaction and of distributing the heat of the sulphonation reaction. A more advanced method is to treat the compounds in the presence of a sulphonating aid, the purpose of which, generally speaking, is to ease the violence of the sulphonation reaction by bringing the sulphonating agent first into reaction with a sulphonating aid, that is a compound which forms with it an intermediate compound under the evolution of substantial heat of reaction. The intermediate compound subsequently reacts with the compound to be sulphonated with the evolution of the direct heat of sulphonation diminished by that amount of heat which was evolved in the formation of the intermediate compound. The application of this advanced method of sulphonation in steps generally utilizes the same principle no matter whether pyridine, ethers, dioxane or our preferred material, thioxane, are used as the sulphonation aid.

The present invention in its broad aspect concerns new addition compounds of thioxane and sulphur trioxide. However, particular methods of carrying out certain sulphonation processes are also within the concept of our invention and it will be useful to demonstrate other advantages which are derived from the use of thioxane as a sulphonation aid.

Frequently, sulphonations of sensitive compounds such as secondary alcohols are carried out in solution and at lower temperature than room temperature and require expensive cooling with ice or refrigerated brine. Furthermore, in many cases, sulphonations must be carried out at low temperatures and in such a way that the reaction is carried out in a relatively short time in order to prevent the sulphonation product from decomposing in its acid state. We have now found that the use of thioxane as a sulphonation aid obviates in many cases the maintenance of reaction temperatures below room temperature. In some cases we have found that the use of thioxane as the sulphonation aid permits the sulphonation of certain materials to be conducted at or even above room temperature without the formation of undesired by-products. This is a marked advantage since these reaction temperatures can be easily and inexpensively maintained by cooling with tap water. Furthermore, we have found that in the presence of thioxane the acid sulphonation products are more stable than in the absence of thioxane under otherwise identical conditions. This fact demonstrates that our sulphonation aid is not only beneficial in the sulphonation reaction but even after its completion.

Our new thioxane sulphur trioxide addition compounds are used advantageously in accordance with our invention to sulphonate various unsaturated olefines. The products of this process are definitely established to be olefinic sulphonic acids. This is shown by the fact that our products are obtained in a substantially quantitative yield from an olefine and sulphur trioxide in the molecular ratio of 1:1. As a consequence of the mildness of our new sulphonation method we are able to practically exclude side reactions. The fact that our products consist of olefinic sulphonic acids is further proven by analysis and by the fact that our compounds have the ability to add iodine, said addition of iodine being a common reaction for testing for the presence of carbon atoms linked by a double bond. From the foregoing it is clear that in our process the sulphonating agent or sulphur trioxide reacts with the olefine by way of sustitution rather than by addition.

Certain surface-active sulphonated derivatives of olefinic hydrocarbons have been prepared hitherto, such as e. g. described in U. S. Patent 2,061,617. The compounds described therein are derived from aliphatic hydrocarbons, having a double bond at the end of the carbon chain, by treatment with strong sulphonating agents, in the presence of a sulphonating catalyst, and, treating the reaction product with a hydrolysing agent.

The chemical composition of the products disclosed hitherto has not been definitely determined. It is believed, however, that the products obtained are most probably hydroxy sulphonic acid derivatives of aliphatic saturated hydrocarbons in which a hydroxy group and a sulphonic acid group occur on the two carbon atoms which in the original olefine were linked through a double bond.

Similar reaction products from olefines, containing non-terminal double bonds are mentioned in U. S. Patent 2,098,114. Sulphonation products of 2-pentene and of olive oil are described, both of the products obtained by the interaction of sulphur trioxide and an olefinic material by using more than 1 molecule of sulphonating agent for 1 molecule of olefinic material.

In a recent publication by C. M. Suter, P. B. Evans and James M. Kiefer, "Journal of the American Chemical Society" 1938 page 538, it is pointed out that by the action of an excess of sulphonating agent on straight chain terminal double bond olefines there are primarily formed olefinic sulphur trioxide addition products of the carbyl sulphate type which may be described by the formula:

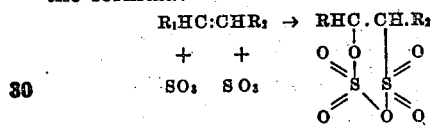

in which $R_1$ and $R_2$ may be a hydrogen atom or one of the R's any alkyl group. By hydrolysing this addition compound a compound of the type

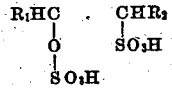

may be obtained, which on further hydrolysis forms a hydroxy sulphonic acid of the formula

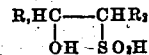

It would, therefore, appear from this article that hydroxy sulphonic acid type compounds, when starting from olefinic material, can only be formed by the action of 2 molecules of sulphur trioxide on one molecule of olefinic material.

It, therefore, appears that in contrast to our present process the sulphonation of olefinic materials as carried out by the prior art has been effected by way of addition rather than substitution. We have not endeavored to determine the exact constitution of our new sulphonic acid products beyond the fact that they consist of unsaturated hydrocarbon sulphonic acids. An exact determination of constitution would involve the determination of the unknown structure of many of the olefines which we have found useful for the production of our new compounds. However, the various types of olefines which we have subjected to sulphonation according to our process have all been found to react in a similar way to give, when treated with one molecule of sulphur trioxide, virtually one molecule of olefinic sulphonic acid. The types of olefines used by us comprise various straight or branch chain olefines and tertiary olefines having a branch chain on an unsaturated carbon atom. Our sulphonation products, therefore, correspond to the general formula:

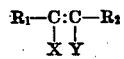

where either $R_1$ or $R_2$ may be a hydrogen atom or both straight or branch chain substituted or unsubstituted hydrocarbon radicals and at least one X or Y may be a hydrogen atom and the other a hydrogen atom or a straight or branch chain alkyl radical, but in no case should X, Y and one of the R's be a hydrogen atom at the same time, one of the hydrogen atoms, either on the double bond or in one of the alkyl groups being substituted by a sulphonic acid group.

Accordingly, the unsaturated hydrocarbons employed in our invention may be any aliphatic unsaturated hydrocarbon, substituted, or not containing from 5—30 carbon atoms and having at least one hydrogen atom attached to a carbon atom carrying a double bond. Also mixtures of such olefines may be employed which may contain unsaturated hydrocarbons of various molecular weights, straight chain olefines, branch chain olefines and tertiary olefines in the presence or absence of saturated hydrocarbons which may act as diluents during the process of sulphonation. Examples of specific olefines useful for conversion into olefine sulphonic acids are: all pentenes or amylenes, all hexanes, heptenes, octenes, nonenes and the like falling within the definition given above.

Such olefines may be derived from primary, secondary and tertiary alcohols by dehydration, or from halogenated hydrocarbons by dehalogenation or from saturated hydrocarbons through cracking or catalytic dehydrogenation, or they may be obtained by the dimeri- and polymerization of olefines such as propylene, butylenes and isobutylenes, pentenes or amylenes, hexenes and isohexenes and the like. They may also be obtained by the decarboxylation of unsaturated fatty acids and by many other ways. Also halogen substituted olefines are suitable in the pursuit of our invention and may be obtained by the conversion of unsaturated aliphatic hydroxy compounds into the corresponding halogen compounds, or by the partial dehalogenation of polyhalogenated aliphatic hydrocarbons or by the addition of halohydrides to alkylacetylenes etc.

In preparing the addition products of thioxane and sulphur trioxide which are the subject of our invention we can proceed in various ways: We can first prepare the sulphur trioxide addition compound with thioxane preferably in a solvent which is inert to the action of our improved sulphonating agent. We can prepare it by adding sulphur trioxide or chlorosulphonic acid to the solvent and then adding the mixture to the thioxane or we can add the sulphonating agent to the solvent-thioxane mixture. Generally, a white precipitate forms in the reaction mixture which may be employed without further treatment as a sulphonating agent. The white precipitate may be separated by filtration and used as a sulphonating agent to be added to the material to be sulphonated. We can also add the sulphonating agent in the form of sulphur trioxide or preferably chlorosulphonic acid to a mixture of a solvent, thioxane and the material to be sulphonated.

Details of the production of our new compound and some of their uses will be more clearly demonstrated in the following examples. It is to be understood that the following examples are merely illustrative and our invention is not to be regarded as restricted thereto.

*Example 1.*—To a solution of 52 parts by weight of thioxane in 370 parts by weight of carbon tetrachloride there were gradually added, while agitating, 63.5 parts by weight of chlorosulphonic acid. During the addition of the acid, a white precipitate appeared in the reaction mixture with considerable evolution of gaseous hydrochloric acid and of heat, so that, in order to maintain the reaction mixture at room temperature, cooling was necessary. After the completion of the addition of the acid, the reaction mixture was heated to 50° C. whereupon more hydrochloric acid was evolved. By filtering the reaction mixture and washing the solids with carbon tetrachloride, 104 parts of undried solids were obtained, which can be kept without decomposition. The composition of the solids, as determined by an analysis, was as follows:

|  | Per cent |
|---|---|
| Thioxane | 49.8 |
| $SO_3$ | 37.8 |
| HCl | .6 |
| Solvent | 11.8 |

This analysis corresponds to a molecular thioxane-sulphur trioxide ratio of 1:0.985.

To the unfiltered reaction mixture as obtained above there was added, while agitating, an additional portion of 60 parts of chlorsulphonic acid. No heat or hydrochloric acid was, however, evolved and part of the precipitate was found dissolved in the chlorsulphonic acid which, on standing, formed the bottom layer of the reaction mixture.

*Example 2.*—To a mixture of 63.5 parts by weight of chlorsulphonic acid and 370 parts by weight of carbon tetrachloride there were added without cooling within 10 minutes 52 parts of thioxane. The temperature of the reaction mixture rose from 28° to 40° C. while a white precipitate appeared with a vigorous evolution of hydrochloric acid gas. After filtering the reaction mixture and washing the solids with carbon tetrachloride, there were obtained 106 parts of solids of the following analysis:

|  | Per cent |
|---|---|
| Thioxane | 49.6 |
| $SO_3$ | 39.9 |
| HCl | 2.9 |
| Solvent | 7.6 |

This analysis corresponds to a molecular thioxane-sulphur trioxide ratio of 1:01.

*Example 3.*—Into a solution of 52 parts of thioxane in 350 parts of ethylene chloride there were distilled from a flask, containing strong fuming sulphuric acid, 40 parts of sulphur trioxide, while maintaining the reaction temperature at 30° C. by cooling. A white precipitate appeared which was separated from the solvent by filtration and dried in vacuo. The dry solid thus obtained is stable up to a temperature of 124° C. where it begins to melt with partial decomposition. An analysis indicated the solid to consist of:

43.3% sulphur trioxide and
56.2% thioxane.

This composition corresponds with the formula:

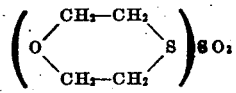

which is that of the addition compound of thioxane with one molecule of sulphur trioxide. The addition compound is difficultly soluble in carbon tetrachloride, chloroform, ethylene chloride and benzene, slightly soluble in ethyl ether, 2.2' dichloro ethyl ether and isopropyl ether and easily soluble in thioxane from which it can be recrystallized in well defined crystals of an unchanged chemical composition.

Recrystallization in thioxane of the solid material, obtained in Examples 1 and 2, from chlorosulphonic acid yielded crystals which are identical with those obtained from sulphur trioxide.

*Example 4.*—To a solution of 52 parts of thioxane in 400 parts of carbon tetrachloride there were distilled from a flask, containing fuming sulphuric acid, 80 parts of sulphur trioxide while maintaining the reaction temperature at 30° C. A white precipitate appeared which was treated as described in Example 3. A white, soft solid was obtained which was found to sinter at 98–99° C., with evolution of sulphur trioxide. An analysis indicated its composition as:

60.1% sulphur trioxide
39.3% thioxane whereas the composition of the compound represented by the formula

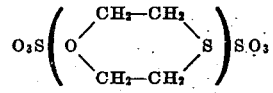

calculates to 60.6% sulphur trioxide and
39.4% thioxane

The prepared material is also difficultly soluble in carbon tetrachloride, ethylene chloride and chloroform and easily soluble in thioxane. When dissolved in the latter product at 50° C., crystals appear on cooling which are identical with those described in Example 3.

*Example 5.*—To a mixture of 350 parts by weight of ethylene-chloride and 52 parts by weight of thioxane there were added gradually 65 parts by weight of chlorosulphonic acid. To the resulting reaction mixture, containing the solid addition compound of thioxane and sulphur trioxide, there was added at 40° C. 112 parts by weight of tetra isobutylene, of the boiling point of 113° C. at 10 mm. obtained by the polymerization of diisobutylene with activated clay. The solid addition compound dissolved in the course of about one hour and a clear, straw colored solution was obtained. This was neutralized at 10° C. with a caustic soda solution and the neutral mixture heated with steam to remove the solvents. The residual aqueous solution was dried and the residue extracted with methanol. From the extract there were obtained, after evaporating the methanol, 147 parts by weight of a brittle, somewhat hygroscopic, white material, which is pure tetra isobutylene sodium sulphonate. The methanol-insoluble-part consisting mainly of mineral salts, amounted to 15 parts by weight.

*Example 6.*—40 parts by weight of sulphur trioxide were added to a mixture of 350 parts by weight of carbon-tetrachloride and 52 parts by weight of thioxane, while maintaining the reaction temperature at 30° C. Finally 35 parts by weight of 2-pentene were added and the mixture was agitated until all solids had disappeared. On standing, the reaction mixture separated into two layers, the upper viscous layer containing the formed 2-pentene sulphonic acid. After the neutralization of this top layer with caustic soda, there were obtained 85 parts by weight of dry 2-pentene sodium sulphonate, which is a very hygroscopic, glass-like material.

*Example 7.*—To a sulphonation mixture consisting of the reaction product of 13.5 parts by weight of thioxane
15 parts by weight of chlorsulphonic acid in
38 parts by weight of carbontetrachloride there were added, at room temperature, 9.8 parts of pure benzene. After agitating for 24 hours at 40°, no substantial reaction with the benzene had occurred.

*Example 8.*—To a solution of 200 parts by weight of benzene 64 parts by weight of naphthalene and
52 parts by weight of thioxane there were added at room temperature 65 parts of chlorsulphonic acid. After agitating for 15 hours, the solution was neutralized. On steam distilling, all the benzene but none of the naphthalene was recovered. The naphthalene was sulphonated and recovered in the form of the α-naphthalene sodium sulphonate.

*Example 9.*—To the reaction product of 52 parts by weight of thioxane and
65 parts by weight of chlorosulphonic acid in
450 parts by weight of carbon tetrachloride, prepared as described in Example 1, there were added, at room temperature 120 parts by weight of secondary alcohols. These alcohols comprised a mixture of secondary alcohols of the probable formula $R.CHOHR^1$, R and $R^1$ denoting alkyl radicals, containing from 7 to 9 carbon atoms, the mixture having an average hydroxy value of 240. This alcohol mixture was obtained by the hydrogenation of ketones which in turn were prepared by condensing a certain fraction of aliphatic monocarboxylic acids as derived from paraffines by oxidation. The sulphonation of the alcohols, which, as we know, can not be carried out in the absence of sulphonation aids without the formation of unsulphonated by-products, was completed upon the disappearance of the solid thioxane-sulphur trioxide addition product. The reaction mixture was neutralized by pouring it into a caustic soda solution containing ice. The neutralized mixture separated into two layers, the bottom layer containing the solvents and the sodium salts of sulphuric acid esters of the alcohols and the top layer consisting of a dilute aqueous mineral salt solution. The bottom layer was separated and steam distilled for the recovery of carbon tetrachloride and thioxane. The residual aqueous liquor was concentrated and yielded 260 parts of a wet paste containing approximately 160 parts of sodium alkyl sulphates which are clearly soluble in water to form surface active solutions.

*Example 10.*—The solids obtained in Example 1 were charged into a mixture of 370 parts by weight of carbon tetrachloride and 45.3 parts by weight of methallylchloride of the formula $CH_2:C(CH_3)CH_2Cl$.

The reaction mixture was stirred for 5 hours at 50° C. after which time all of the solids had disappeared. On standing there appeared instead a viscous oily layer on the solvent which contained chlor-methallyl sulphonic acid. The layer was separated, neutralized with caustic soda solution and dried.

94 parts by weight of a glassy, hygroscopic solid were obtained, the analysis of which indicated it to be sodium sulpho methallyl chloride of the formula $NaO_3S(CH:C(CH_3)CH_2Cl)$.

*Example 11.*—Into a mixture of 35 parts of di ethyl ether and
35 parts of chlorosulphonic acid there were charged at a temperature of 5–10° C.
45 parts of olefines, obtained by the dehydration of secondary alcohols such as were used in Example #9. Due to the evolution of a considerable amount of heat, a gradual charging of the olefines under good cooling of the reaction vessel is required. After the completion of the addition of the olefines, the clear solution was stirred for 20 minutes at 5–10° C. It was then neutralized by pouring into ice containing caustic soda solution. The neutral reaction mixture was then shaken with butanol and the butanol layer evaporated to dryness. An oily substance was obtained which emulsified in water. The oily material was taken up in a mixture of equal parts of methanol and water and then shaken with petrol ether. The aqueous methanol layer and the petrol ether layer were dried separately and there were obtained:

12 parts of a water-soluble waxy solid from the aqueous methanol layer and
34 parts of oil from the petrol ether layer.

An analysis of the solid gave the following result:

| | Per cent |
|---|---|
| Chlorine | 0.85 |
| Total sulphur | 13.74 |
| Sodium sulphate ash | 35.85 | indicating for its composition:

1.40% NaCl
9.24% $Na_2SO_4$ and
89.36% of an organic sulphonated material, containing
13.1% organically combined sulphur.

The sodium salt of an olefine sulphonic acid, derived from an olefine of the molecular weight of 222 would contain 9.86% organically combined sulphur, and a corresponding sulphuric acid ester would contain still less, indicating that the sulphonated compound obtained in a rather incomplete yield can only contain the sulphonic acid derivative of the original olefine in a small proportion.

*Example 12.*—A solution containing 350 parts of ethylene chloride and
44 parts of 1.4 dioxane was cooled to 0° C. and
65 parts of chlorsulphonic acid were added while maintaining the temperature at 0° C. The reaction mixture was then cooled to —10° C. and while maintaining this temperature a mixture of 100 parts of ethylene chloride and
112 parts of tetraisobutylene were gradually added while agitating. After the completion of the charge, the mass was agitated for ½ hour at —10° C. and then neutralized by pouring onto a mixture of ice and sodium hydroxide. The neutral mass was steam distilled for the removal of the solvents and of unsulphonated material. The remaining aqueous solution was dried and extracted with boiling methanol. On cooling white characteristic crystals precipitated from the methanol solution, which were separated by filtration. The filtrate, on drying, left a white solid which is clearly soluble in water to give surface-active solutions. The yield of materials obtained was as follows:

21.4 parts of unsulphonated oily material
28.1 parts of material, precipitated from the methanol solution which contained 14.8% organically combined sulphur and possessed the property of adding iodine. The product was identified as diisobutylene sodium sulphonate.

106.1 parts of solids were obtained from the methanol filtrate which solids consisted of 3.6 parts of sodium chloride and 102.5 parts of a material, containing 9.5% organically combined sulphur and which also possessed the property of adding iodine. This product, therefore, consists of tetraisobutylene sodium sulphonate. The percentage yield of the theoretical is, therefore, as follows:

63% tetraisobutylene sodium sulphonate
13.2% diisobutylene sodium sulphonate
19.1% unreacted tetraisobutylene (oil), with a total recovery of
95.3% of reaction materials.

Conducting the reaction at higher temperatures decreased the yield of tetraisobutylene sulphonate.

*Example 13.*—Into a solution of 300 parts of ethylenechloride and 52 parts of thioxane there were charged at 40° C. 60 parts of chlorsulphonic acid and then 84 parts of triisobutylene of the boiling point of 179° C. The reaction mixture was agitated until all solid matter had dissolved and then said mixture was neutralized at 10° C. with caustic soda solution. After the removal of the solvents by steam distillation a clear solution was obtained which, on evaporation, yields a white, brittle solid which, according to analysis, is practically pure triisobutylene sodium sulphonate, containing approximately 12% sodium chloride as the only impurity. The solid exhibits surface-active properties.

*Example 14.*—To a solution of 52 parts of thioxane and 300 parts of ethylene chloride there are added, under agitation, 65 parts of chlorsulphonic acid, followed by 70 parts of a mixture of commercial diamylene of the boiling range 150–170° C. The reaction temperature is kept at 40° C. and the sulphonation is completed after four hours. The reaction mixture is neutralized at 10° C. with caustic soda solution and the solvents removed by steam distillation. The remaining clear solution is evaporated to dryness. The solid obtained is a mixture of diemylene sodium sulphonates and small amounts of mineral salts and is clearly soluble in water. Its solutions have surface-active properties.

*Example 15*

144 parts of commercial oleylchloride were added to the reaction product of
52 parts of thioxane and
65 parts of chlorsulphonic acid in
350 parts of ethylene chloride at 40° to 50° and the mixture agitated until a homogeneous liquid was obtained. The reaction mixture was then neutralized with soda ash solution. The neutralized liquid separated into two layers, the lower containing the formed 1-chlor-9 octadecylene sodium sulfonate, dissolved in thioxane and ethylene chloride. This layer is separated and the solvents removed by steam distillation. The remaining aqueous solution is concentrated to yield the above named compound in the form of a soap-like brownish material which is soluble in water and which displays surface-active properties.

*Example 16.*—Into 300 parts of chloroform containing the product formed by the action of 40 parts of sulphur trioxide and 52 parts of thioxane, there were charged under agitation at 0° C. 56 parts of commercial di-isobutylene of the boiling point 100–103° C. The composition of commercial di-isobutylene is:

| | Per cent |
|---|---|
| 2.4.4. trimethyl pentene-1 | 80 |
| 2.4.4. trimethyl pentene-2 | 20 |

In the course of one to two hours the solid sulphur-trioxide-thioxane product disappeared, indicating the completion of the sulphonation. The reaction mixture was neutralized with caustic soda solution and then steam distilled for the removal of the solvents. The residual opaque gel, on drying, leaves a brittle white solid which is di-isobutylene sodium sulphonate. It is sparingly soluble in cold and moderately soluble in hot isopropanol from which it can be recrystallized in light needle-like crystals. The product forms lathery aqueous solutions of good wetting strength, and which product is identical with the diisobutylene sodium sulphonate obtained as a by-product in Example 12.

*Example 17.*—To the reaction product of 52 parts by weight of thioxane and 65 parts by weight of chlorsulphonic acid in 300 parts by weight of ethylene chloride there were added, at room temperature, 56 parts by weight of iso-octenes of the boiling point 106–108° C. which were obtained as the polymerization products of isobutylene with normal butylenes. After completion of the sulphonation the reaction mixture was neutralized with caustic soda solution and the solvents are steam distilled off. The remaining aqueous solution is evaporated to dryness to yield 106 parts of iso-octene sodium sulphonates, a white, brittle solid which can be ground to a powder. It is soluble in water and ethyl alcohol and difficultly soluble in hydrocarbon solvents. It displays surface-active properties.

*Example 18.*—Higher olefinic hydrocarbons were prepared as follows: The polymerization product of isobutylene and N-butylenes, boiling between 106 and 108° C. and known as co-polymer were subjected to a treatment with aluminum chloride at 10° C. After the removal of the aluminum chloride, the resulting oil was steam-distilled for the separation of lower olefines. The residual oil was fractionated in vacuo and the following fractions were obtained:

I. Boiling at 10 mm. up to a temperature of 150° C.
II. Boiling at 2 mm. between 110 to 180° C.
III. Residue.

183 parts of Fraction I were charged, at room temperature, into the reaction mixture obtained by adding 90 parts of chlorosulphonic acid into the solution of 100 parts of thioxane in 200 parts of ethylene dichloride. After approximately 30 minutes a dark red solution was obtained which was neutralized at 10° C. with a caustic soda solution. The neutral solution was steam distilled for the removal of ethylene dichloride and thioxane. The residue was dried, taken up in cold methanol and the methanol solution extracted twice with petrol ether. The methanol layer on drying, left 195 parts of a soap-like mass which is readily soluble in both organic solvents and water to give solutions which are highly surface-active in that they can be easily emulsified in water or organic solvents. The aqueous solutions show great wetting strength and detergent action.

*Example 19.*—To a mixture of 175 parts of ethylenechloride and
52 parts of thioxane there were charged, at room temperature, 65 parts of chlorosulphonic acid. The reaction mixture was heated to boiling under a reflux condenser for 3 minutes to remove most of the hydrochloric acid vapors and then cooled to 25° C. Then there were charged at once 17.5 parts of 2-pentene and the reaction mass heated to 50–60° C. and stirred until, in the course of two to three hours all solids had dissolved. The reaction mixture was then neutralized at 10° C. by passing into caustic soda solution. The neutral solution separated into two layers; the aqueous layer, containing the neutral reaction products, is dried to give 88 parts of a white solid, which has the following composition.

2.61% sodium chloride
13.5% sodium sulphate and
83.89% of an organic material, containing 21.6% organically combined sulphur. A compound of e. g. the formula

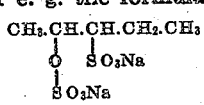

contains 21.90% organically combined sulphur, whereas a 2-pentene sodium sulphonate contains 18.6% organically combined sulphur. The analysis indicates, therefore, that the greater part of the sulphonated material contained in the analyzed product consists of compounds which are more highly sulphonated than 2-pentene sodium sulphonate.

*Example 20.*—Higher olefinic hydrocarbons were prepared from a mixture of decenes, commercially available under the name of diamylenes, in a manner described in the following. Redistilled commercial di-amylenes of the boiling point 150–170° C. were polymerized at 0° C. in the presence of aluminum chloride. The aluminum chloride was removed from the resulting oil which after the separation of unpolymerized di-amylenes, was divided by distillation into three fractions I. Boiling at 10 mm. between 110–130° C.
II. Boiling at 10 mm. between 130–170° C.
III. Residue boiling at 10 mm. above 170° C.

198 parts of Fraction I were charged at −10° C. into the reaction mixture of 65 parts of thioxane and 50 parts of sulphur trioxide in 525 parts of carbontetrachloride. After 30 minutes of stirring the reaction mass was neutralized with caustic soda solution. The neutral solution was steam distilled for the removal of the carbontetrachloride and most of the thioxane. The residue was dried, taken up in methanol and the methanol solution extracted twice with petrol ether. The methanol layer, on drying, left 204 parts of a yellow rubbery substance which is readily soluble in soft and hard water as well as in organic solvents. The substance is an excellent wetting agent and a very effective detergent.

*Example 21.*—To a mixture of 350 parts of ethylene chloride and 78 parts of thioxane there were added 60 parts of chlorsulphonic acid. The temperature was raised to 50° C. and 119 parts of heptadecylene were added. The heptadecylene of the boiling point 145–146° C. at 13 mm. was obtained by the dehydration of commercial synthetic heptadecyl alcohol by means of sulphuric acid. After the completion of the sulphonation, the reaction mixture was neutralized with caustic soda solution and the solvents removed by steam sulphonation. The remaining soapy jelly was evaporated to dryness and 161 g. of a pale yellow soap-like material were obtained. The material contains as its only impurity a small amount of mineral salts. It is soluble in water, alcohol and most organic solvents and has very valuable surface-active properties.

*Example 22.*—Into a solution of 52 parts of thioxane in 300 parts of carbontetrachloride there were distilled, from a flask containing fuming sulphuric acid, 40 parts of sulphur trioxide. Into the reaction mixture, containing the insoluble addition product of sulphur trioxide and thioxane, there were charged at 20° C., 130 parts of a poly isobutylene fraction, boiling within a temperature range of 130–170° C. at 10 mm. mercury pressure. This fraction was obtained from a mixture of polymerized diisobutylene formed by the action of boron fluoride on di-isobutylene of the boiling point of 100–103° C. After one hour of agitation a clear wine-red solution was obtained, indicating the completion of the sulphonation. The reaction mixture was neutralized at 10° C. with caustic soda solution and the solvents were removed by steam distillation from the slightly alkaline mass until a clear gel was obtained which, on drying, yielded an almost white rubbery solid consisting of practically pure higher olefine sulphonic acid salts. Traces of mineral salts may be removed from it by extraction with methanol, ethyl alcohol, benzene, a gasoline fraction or a like solvent. The extract, on evaporation, yields a mixture of pure olefine sodium sulphonates which have been found to be extremely valuable surface-active products.

The above examples demonstrate methods of producing reaction products of thioxane with sulphuric acid derivatives and a few typical uses for which they may be employed. The examples merely illustrate some preferred embodiments of our invention since it is obvious that other sulphuric acid derivatives than sulphur trioxide or chlorsulphonic acid may be used. To cite a few others, we note that fluorsulphonic acid, sulphuryl chloride, methyl sulphonic acid and other compounds are useful sulphonating agents which may be used either alone in the presence of thioxane or in combination with hydrocarbons, ethers, polyethers, inorganic and organic acid anhydrides, acid chlorides and the like.

It is obvious that a great number of uses can be found for our new sulphonation aid. We cite for instance the sulphonation of hydroxy compounds to the corresponding sulphuric acid esters. Such esters have many applications and are employed as useful surface-active materials in many industries. They may be employed as chemical intermediates, as water soluble dyestuffs and as dyestuffs for the printing of textiles. It would lead this case too far afield to enumerate the different groups of hydroxy compounds the sulpho derivatives of which have become useful. Suffice to say, however, our combination of thioxane with sulphonating agents may be employed in the treatment of primary, secondary and tertiary mono and poly hydroxy derivatives of substituted or unsubstituted aliphatic and aromatic hydrocarbons, of ethers, poly ethers, acids, esters, amines and other compounds.

The foregoing examples also show, that sulphonating agents in the presence of thioxane are capable of selective sulphonation of unsaturated hydrocarbons. Thus, our combination may be used with advantage for the selective sulphonation of aromatic hydrocarbons and for sulphonations under mild conditions in order to eliminate or decrease the formation of undesired by-products. It is, of course, obvious that the hydrocarbons to be treated may be substituted by halogen, and/or nitro groups and they may contain ether linkages, carbonyl groups and carboxylic acid groups which latter may be free or esterified.

Certain of the foregoing examples demonstrate some of the olefine sulphonic acid compounds of our invention and the procedures by which they may be obtained. Our examples furthermore indicate that although olefine sulphonic acid compounds may also be formed by sulphonating an olefine in the absence of thioxane, frequently in this case, especially when using higher olefines, a scission of the double bond of the original olefine occurs under the formation of lower olefines and olefine sulphonic acid compounds. Such a scission of the double bond prevents the complete sulphonation of an olefine when molecular quantities of the olefine and sulphonating agents are employed, whereas the use of an excess of sulphonating agent results in the formation of more highly sulphonated products which may be either compounds of the carbylsulphate type or sulphonic acids of lower olefines formed by the splitting up of the original olefines. Sulphonating olefines of the types as specified above, in the presence of thioxane, however, leads to the uniform formation of sulphonic acid compounds of the unchanged olefines when one molecule of sulphonating agent or less is used per one molecule of olefine whereas the use of an excess of sulphonating agent results in the formation of higher sulphonated products which are undesirable from the viewpoint of our invention, or in the formation of sulphonic acids of lower olefines, the formation of which products from higher olefines is also in most cases undesirable since it can be accomplished in an easier way by sulphonating the respective lower olefines with an equimolecular amount of sulphonating agent.

The olefine sulphonic acid compounds of our invention are extremely useful compounds since a number of them in the form of their sodium, potassium, ammonium or other salts of a monovalent base are highly surface-active materials in that they show great wetting, deterging and emulsifying strength. No attempt has been here made to define the fields of usefulness of the olefine sulphonic acids prepared as described above since the same would necessarily be incomplete and also quite unnecessary to a complete understanding of the present invention. Suffice to say, said compounds have surface active or capillary active properties and may, therefore, be used to great advantage in any process involving wetting, penetrating, deterging, dispersing, emulsifying, deemulsifying, frothing, foaming, softening and like phenomena. The compounds may be used in pure or standardized form and alone or in combination with any known treating agents with or without the addition of other known materials having surface active properties.

We claim:

1. Thioxane sulphur trioxide addition compounds of the formula:

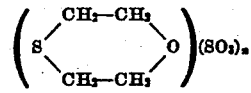

wherein $n$ is a whole number selected from the group consisting of 1 and 2.

2. Thioxane sulphur trioxide addition compounds of the formula:

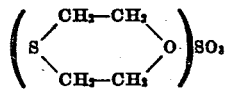

3. Thioxane sulphur trioxide addition compounds of the formula:

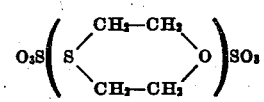

4. The process which comprises reacting a sulphuric acid derivative selected from the group consisting of fuming sulphuric acid, sulphur trioxide, sulphuryl chloride, methyl sulphonic acid, chlorsulphonic acid and fluorsulphonic acid with thioxane thereby forming a thioxane-sulphur trioxide addition compound.

5. The process of forming thioxane-sulphur trioxide addition compounds which comprises reacting thioxane with chlorsulphonic acid.

PAUL NAWIASKY.
GERHARD EWALD SPRENGER.